(12) United States Patent
Daimon et al.

(10) Patent No.: US 6,168,515 B1
(45) Date of Patent: Jan. 2, 2001

(54) AIR CONDITIONING INTAKE DOOR CONTROL

(75) Inventors: Yuji Daimon, Tochigi; Hiroki Nagayama, Yokohama, both of (JP)

(73) Assignees: Calsonic Corporation, Tokyo; Nissan Motor Co., Ltd., Yokohama, both of (JP)

(*) Notice: Under 35 U.S.C. 154(b), the term of this patent shall be extended for 0 days.

(21) Appl. No.: 09/348,475

(22) Filed: Jul. 7, 1999

(30) Foreign Application Priority Data

Jul. 7, 1998 (JP) .................................................. 10-191842

(51) Int. Cl.[7] .................................. B61D 27/00; B63J 2/00
(52) U.S. Cl. ............................ 454/75; 165/249; 236/78 D
(58) Field of Search ................................. 236/49.3, 78 D; 165/249; 454/75, 256

(56) References Cited

U.S. PATENT DOCUMENTS 5,320,577 * 6/1994 Tooru et al. ............................ 454/75
5,725,425 * 3/1998 Rump et al. ......................... 165/249
5,980,378 * 11/1999 Wieszt ..................................... 454/75

FOREIGN PATENT DOCUMENTS 5-294132   11/1993  (JP) .
5-294133   11/1993  (JP) .

* cited by examiner

Primary Examiner—William Wayner
(74) Attorney, Agent, or Firm—Foley & Lardner

(57) ABSTRACT

A vehicle air conditioning control system includes an actuator for controlling the position of an outside air intake door and an ambient exhaust gas sensor. A controller of the control system monitors a time rate of change of the degree of uncleanness periodically measured on the basis of the output of the sensor, and commands the actuator to bring the intake door to the fully closed position for the inside air recirculation mode if a first requirement about a previous exhaust gas concentration change and a second requirement about a current exhaust gas concentration change are both met.

12 Claims, 6 Drawing Sheets

AIR CONDITIONING INTAKE DOOR CONTROL

BACKGROUND OF THE INVENTION

The present invention relates to technique for controlling the amount of outside air admitted to a vehicle compartment in accordance with an unclean condition of the outside air.

A conventional air conditioner intake door control system is shown in JSAE technical paper "GAKUJUTU KOENKAI MAEZURISHU 975" pages 149~152, published October 1997 by Society of Automotive Engineers of Japan, Inc. This system senses an outside exhaust gas concentration with a sensor and control the position of an intake door in accordance with the sensor output.

SUMMARY OF THE INVENTION

It is an object of the present invention to provide control apparatus and method for effectively preventing inflow of outside exhaust gases into a vehicle compartment.

An outside air intake quantity control apparatus according to one aspect of the present invention comprises:

exhaust gas concentration calculating means for calculating an ambient exhaust gas concentration from a sensor output signal of an ambient exhaust gas sensor;

differentiating means for calculating a derivative of the exhaust gas concentration representing a time rate of change of the exhaust gas concentration;

first checking means for checking a previous value of the derivative calculated at a previous time, to determine whether a previous exhaust gas concentration change is in stable state or in a changing state in a clean direction toward a cleaner state;

second checking means for checking whether a current value of the derivative calculated at a current time is equal to or greater than a predetermine derivative threshold; and controlling means for commanding reduction of the quantity of the outside air introduced into the vehicle to a minimum value when the previous exhaust gas concentration change is in one of the stable state and the changing state in the clean direction and the current value of the derivative is equal to or greater than the predetermine derivative threshold.

A vehicle air conditioning system according to one aspect of the present invention comprises output, input and control sections. The output section comprises an actuator for varying an outside air inlet opening degree in response to a control signal. The input section comprises an outside air condition sensor for sensing an unclean condition of the outside air. The control section comprises a controller for controlling the outside air inlet opening degree in accordance with an output signal of the outside air condition sensor, for determining an outside air condition quantity indicative of a degree of uncleanness in accordance with the output signal of the outside air condition sensor, and for reducing the outside air inlet opening degree to a minimum setting when a previous change of the outside air condition quantity is not in an unclean direction toward a less clean state, and at the same time a current change of the outside air condition quantity has a direction in the unclean direction and a magnitude greater than or equal to a predetermined threshold.

An air intake door control process according to one aspect of the present invention comprises; ascertaining a sensed ambient exhaust gas concentration; calculating an outside air condition quantity from the sensed ambient exhaust gas concentration; determining a time series of values of a time rate of change of a degree of uncleanness of the outside air; checking a previous value of the time rate to determine whether a previous exhaust gas concentration change is in one of a stable state and a changing state in a clean direction toward a cleaner state; further checking whether a current value of the time rate is equal to or greater than a predetermine rate threshold; and commanding the intake door to close the outside air inlet when the previous exhaust gas concentration change is in one of the stable state and the changing state in the clean direction and the current value of the derivative is equal to or greater than the predetermine rate threshold.

DETAILED DESCRIPTION OF THE INVENTION

Figure 1:
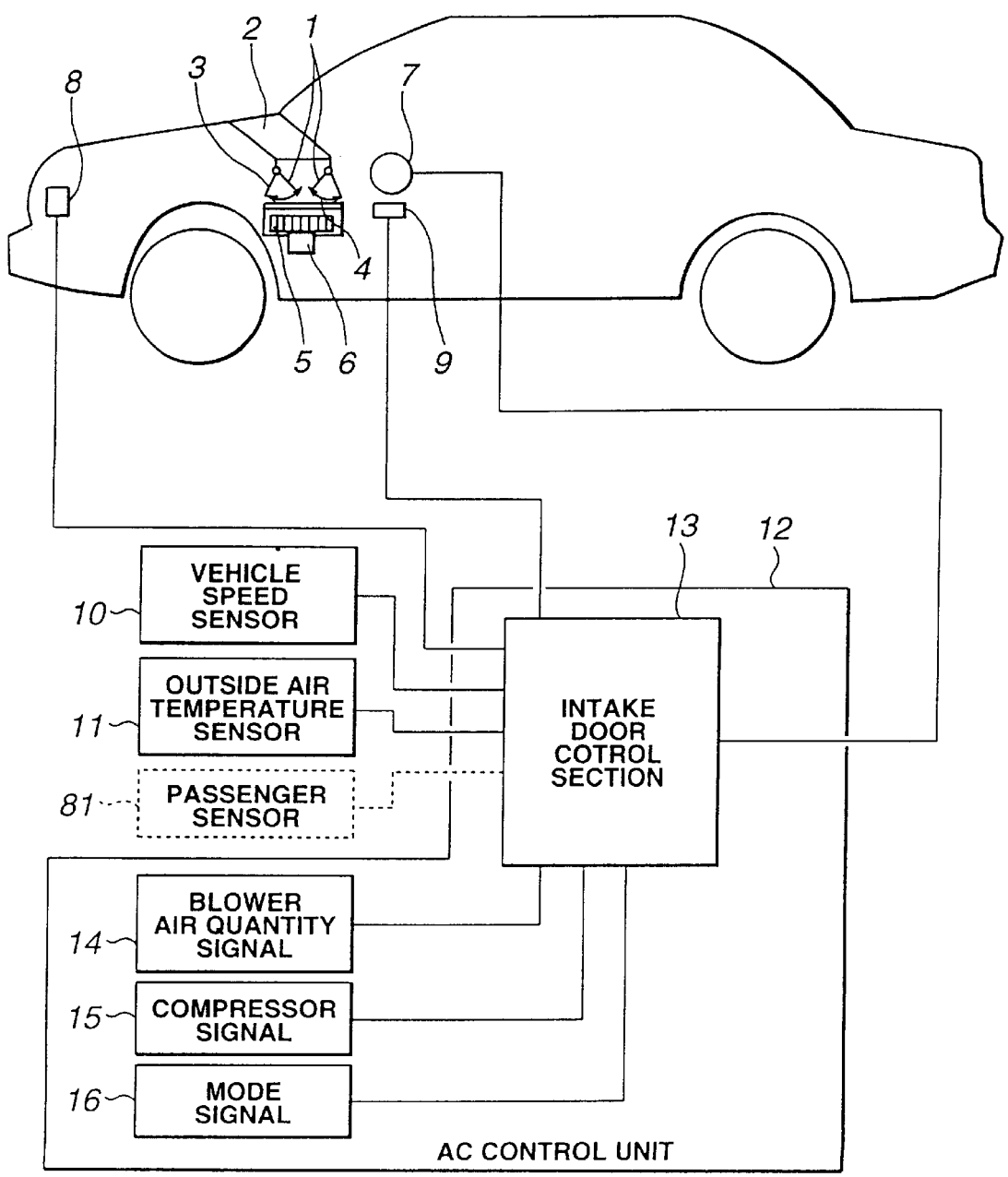
FIG. 1 is a schematic view of an intake door control system according to one embodiment of the present invention.

FIG. 1 shows a motor vehicle equipped with an air conditioner intake door control system according to one embodiment of the present invention.

As shown in FIG. 1, there are: an air intake door 1, an outside air inlet 2, an inside air inlet 3, a deodorizing filter 4, a blower 5, a blower motor 6, a servo motor 7 (serving as an actuator for moving the intake door 1), an ambient exhaust gas sensor 8, a door position sensor 9, a vehicle speed sensor 10, an outside air temperature sensor 11, an air conditioner control unit 12, an intake door control section 13, a blower air quantity signal 14, a compressor signal 15 and a mode signal 16.

The intake door 1 is disposed on the air intake side of the blower 5, and driven by the servo motor 7 serving as the intake door actuator. When the intake door 1 is at a fresh position (FRE) for closing the inside air inlet 3, the outside air introduction percentage is 100%. When the intake door 1 is at a recirculation position (REC) for closing the outside air inlet 2, the outside air introduction percentage is 0%, and the operating mode is in an inside air recirculation mode. The deodorizing filter 4 is disposed between the intake door 1 and the blower 5, for removing undesired odors of exhaust gases with activated carbon or other deodorant substances.

The ambient exhaust gas sensor 8 produces a voltage signal Vs representing an exhaust gas concentration of the outside air, by utilizing a resistance change responsive to the presence of a gas. A gas sensing element of the exhaust gas sensor 8 includes a gas sensing section comprising $SnO_2$ as main component, formed on a ceramic substrate, and a heater section for heating the sensing section to promote the gas reaction. The sensing section responds to a reducing gas substance, and varies an electric resistance by the oxidation-reduction reaction. In this example, the exhaust gas sensor 8 is disposed at a front grille of the vehicle where changes in temperature and humidity are small and accurate and effective detection of the exhaust gases is possible. The position of the exhaust gas sensor 8 is upstream of the intake door 1 in the air flow, and foremost in the vehicle body, so that this control system can detect exhaust gases early, and reliably prevent inflow of exhaust gases into the passenger compartment.

The door position sensor 9 senses the position of the intake door 1 and supplies information on the opening degree of the intake door 1 to the intake door control section 13 as feedback information.

The vehicle speed sensor 10 senses a vehicle speed Vc and supplies information on the vehicle speed to the intake door control section 13.

The outside air temperature sensor 11 senses an outside air temperature (or ambient air temperature) AMB and supplies information on the outside air temperature to the intake door control section 13.

In the example shown in FIG. 1, there is further provided a passenger sensor 81 for sensing the number of passengers in the vehicle.

The air conditioner control unit 12 monitors changes of the temperature in the passenger compartment due to changes in the outside air temperature, the quantity of solar radiation, the number of passengers and other conditions by receiving input information from various sensors, and automatically controls the discharged air temperature and quantity (or rate) and the conditions of the air intake opening and air ventilation openings (or vents). In this example, the control unit 12 includes a microcomputer as a main component.

The intake door control section 13 is one control section provided in the control unit 12. The intake door control section 13 detects an unclean or polluted condition of the outside air with the exhaust gas sensor 8, and automatically controls the position of the intake door 1. The intake door control section 13 receives the blower air quantity signal (or blower speed signal) 14 in the form of a blower motor voltage, the compressor signal 15 to monitor the on or off state of the air conditioner, and the mode signal 16 to monitor the operation mode such as a defrosting mode (DEF) or an auto recirculation mode (Auto REC). These signals 14, 15 and 16 are internal signals in the control unit 12.

This control system is operated as follows:

[Intake Door Control]

Figure 2:
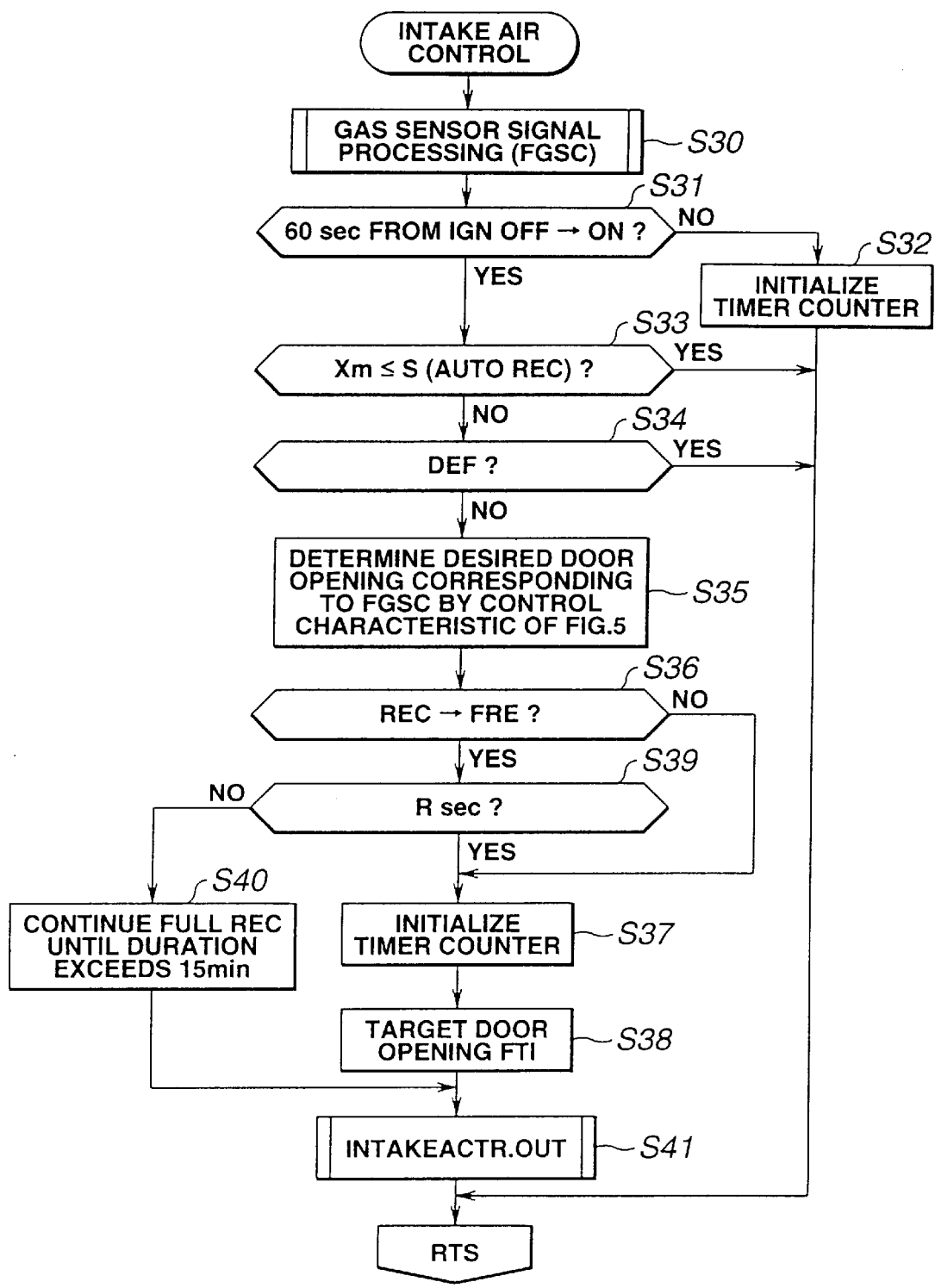
FIG. 2 is a flowchart showing a control flow of exhaust gas adaptive intake door control performed by the control system of FIG. 1.

FIG. 2 shows a sequence of operations performed by the intake door control section 13.

A step S30 includes a sequence of operations for processing the exhaust gas sensor output signal to determine a value of a final gas sensor output variable (final control input variable) FGSC from a value of a gas sensor output A/D quantity GSAD in response to a subroutine call.

At a step S31, the control section 13 checks whether a predetermined time (of 60 sec, for example) has elapsed from a switch-on operation of an ignition switch of the vehicle from OFF to ON. The predetermined time is set equal to a time length (60 sec) required from a power-on until the sensor output becomes sufficiently stable. Before the elapse of the time of 60 sec, the control section 13 proceeds to a step S32, and initializes a time counter of a delay timer or a delay counter for introducing a delay in a REC to FRE operation.

At a step S33, the control section 13 checks whether the operating mode is the auto recirculation mode (Auto REC) for fixing the air intake opening in the inside air recirculating state (REC). If the auto recirculation mode is selected, the control section 13 returns without performing an exhaust gas responsive intake door control.

At a step S34, the control section 13 checks whether the defog (or defrost) mode for clearing the windshield and/or side windows is selected or not. When the defog mode is selected, the control section 13 returns without performing an exhaust gas adaptive intake door control.

Figure 5:
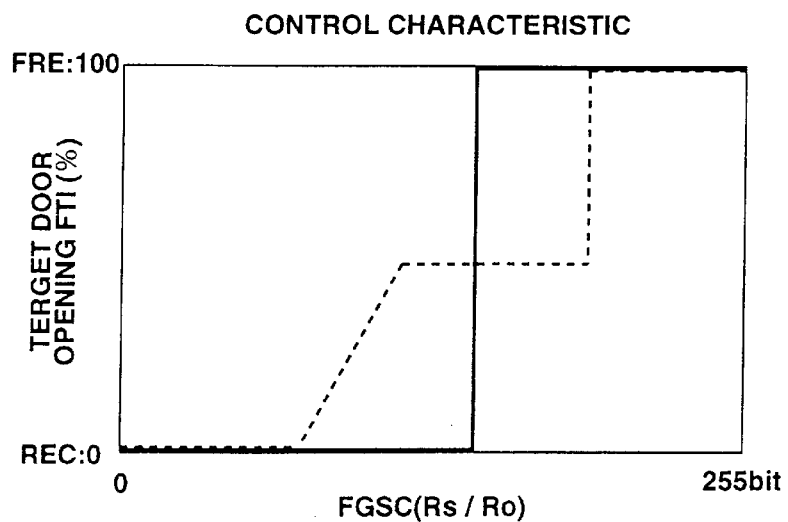
FIG. 5 is a graph showing a target intake door opening control characteristic in the exhaust gas concentration adaptive control of FIG. 2.

At a step S35, the control section 13 determines an intake door opening (or control output variable) from the control gas sensor variable (or final control input variable) FGSC calculated at the step S30 according to a control characteristic shown in FIG. 5, and sets a delay time R sec (20 sec~30 sec, for example).

At a step S36, the control section 13 determines whether the requested intake door movement is in the direction from REC to FRE. From the step S36, the control section 13 proceeds to a step S37 if the answer is NO (the direction is from FRE to REC), and to a step S39 if the answer is YES (the direction is from REC to FRE).

At the step S37, the control section 13 initializes the time counter of the delay timer.

At a step S38 following the step S37, the control section 13 sets the intake door opening degree determined at the step S35 as a target intake door opening (final control output variable) FTI.

At the step S39, the control section 13 checks whether the delay time R sec has elapsed. After the elapse of the delay time R sec, the control section 13 proceeds to the steps S37 and S38 for initialization of the time counter and setting of the target door opening FTI.

Before the elapse of the delay time R sec, the control section 13 proceeds from the step S39 to a step S40, and sets the target intake door opening FTI invariably at a value of FULL REC (a fully closed position). However, the continuous duration of holding the intake door continuously at the fully closed position is limited to a predetermined maximum time length which in this example is 15 min, in consideration of increase of the $CO_2$ percent in the passenger compartment. Therefore, the continuation of the fully closed condition of the intake door 1 does not exceed the predetermined maximum time length. It is optional to employ the passenger sensor 81 for determining the number of passengers, and to decrease the maximum time length with increase in the number of passengers to prevent the percentage of $CO_2$ in the passenger compartment from increasing too much.

At a step S41, the control section 13 delivers a control signal to command the servo motor 7 to achieve the target intake door opening FTI determined at the step S38 or S40.

[Gas Sensor Signal Processing]

Figure 3:
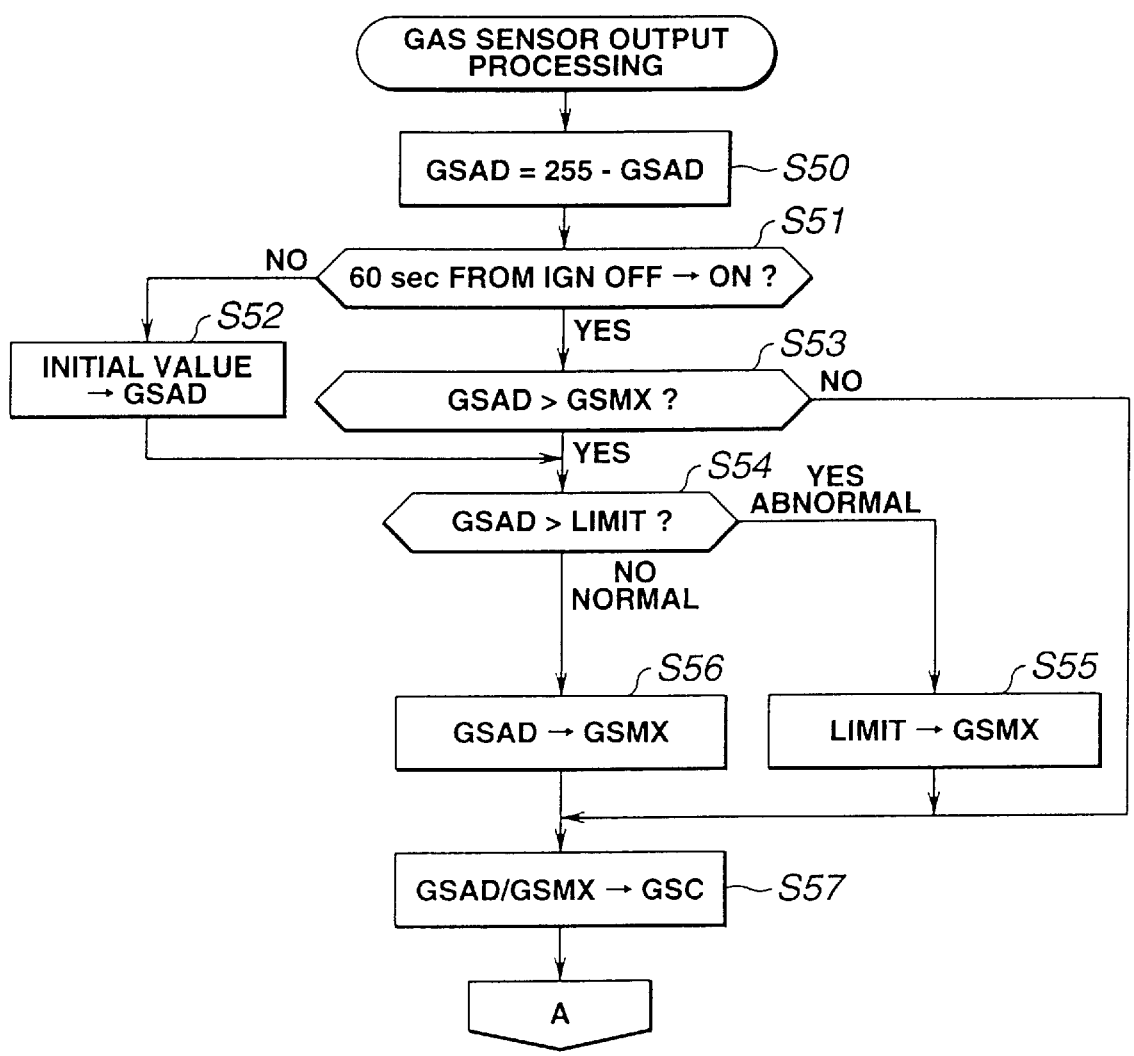
FIGS. 3 and 4 are flowcharts showing a process of processing a gas sensor output signal which is performed in the control system of FIG. 1.
Figure 4:
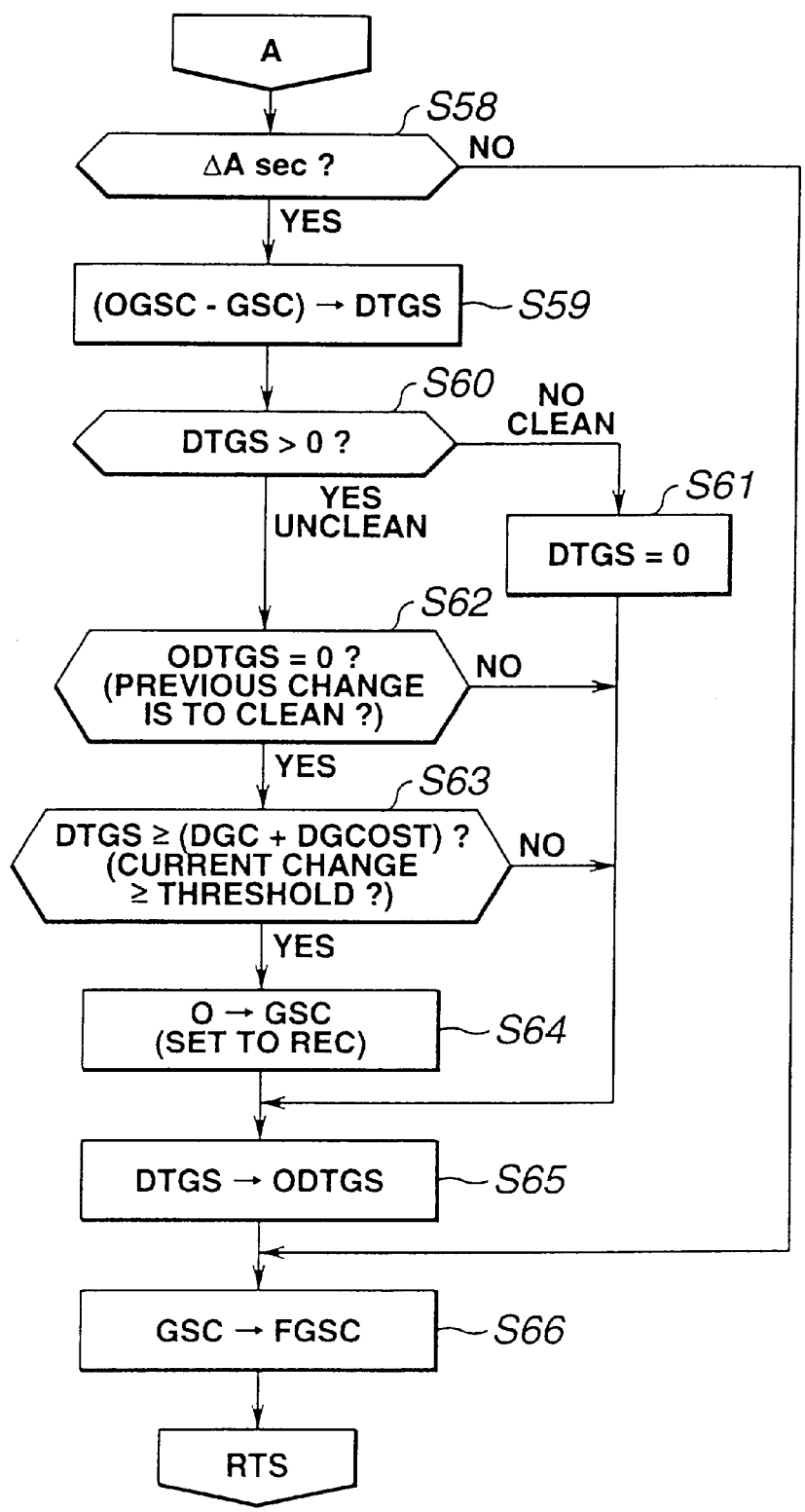

FIGS. 3 and 4 show the gas sensor signal processing process performed by the control section 13.

Steps S50~S57 are designed to calculate the degree of cleanness or cleanness degree (or gas sensor output variable) GSC (0%~100%) indicative of the sensed exhaust gas concentration, from a gas sensor output A/D quantity GSAD and a reference cleanness degree GSMX. Instead of converting the digitized gas sensor output GSAD directly to the variable representing the exhaust gas concentration, the control system of this example uses, as a reference value, the reference cleanness degree GSMX in order to compensate for unit-to-unit variation of exhaust gas sensors, and temperature and humidity characteristics. (The steps S50~S57 correspond to means for calculating an exhaust gas concentration or an outside air condition quantity representing the degree of uncleanness.)

At the step S50, the control section 13 determines the gas sensor output A/D quantity GSAD by using an equation expressed as GSAD=255−GSAD, from the current value of the gas sensor output GSAD obtained in the current operation cycle. By subtraction from 255, the control system of this example expresses the degree of uncleanness of the outside air in the form of 255 bits, and inverts the characteristic. Therefore, the gas sensor output A/D value GSAD is limited between a maximum value of 255 representing the highest cleanness degree, and a minimum value of 0 representing the highest uncleanness degree.

At the step S51, the control section 13 checks whether a time of 60 sec has elapsed from a switch-on operation of the ignition switch from OFF to ON. The control section 13 proceeds to the step S52 in the case of NO, judging that the sensor output has not yet become stable, and to the step S53 in the case of YES.

Before the elapse of 60 sec from the ignition switch-on operation, the control section 13 sets, at the step S52, an initial value GSAD of the reference cleanness degree GSMX.

After the elapse of 60 sec from the ignition switch-on operation, the step S53 is reached and the control section 13 compares the gas sensor output A/D value GSAD determined at the step S50, with the reference cleanness degree GSMX. The reference cleanness degree GSMX is a highest value of the cleanness degree from the ignition switch-on operation to the previous control operation cycle. The reference cleanness degree GSMX is stored in a storage device such as a rewritable RAM.

When GSAD is greater than GSMX (GSAD>GAMX), and hence the answer of the step S53 is YES, then the control section 13 proceeds to the step S54, and compares the gas sensor output A/D quantity GSAD with a limit value (LIMIT) of GSMX. The limit value is a predetermined value beyond which the cleanness degree cannot exceeds. (In this example, the maximum limit value is 255.)

If the gas sensor output A/D value GSAD is greater than the limit value LIMIT, the control section 13 judges that the gas sensor output GSAD is abnormal, and proceeds to the step S55 to store the limit value LIMIT as the reference cleanness degree GSMX.

If the gas sensor output A/D quantity GSAD is equal to or smaller than the limit value LIMIT, the control section 13 judges that the sensor output A/D value GSAD is normal, and stores the current sensor output A/D value GSAD as GSMX at the step S56.

At the step S57, the control section 13 determines a ratio (GSAD/GSMX) of the gas sensor output A/D value GSAD to the reference cleanness value GSMX, and sets this ratio as a relative cleanness degree (or modified gas sensor output) GSC. In this example, GSC is used as a variable quantity representing the degree of cleanness of the outside air.

Steps S58~S66 are designed to differentiate the relative cleanness degree GSC (0% 100%) determined at the step S57 and to determine a final cleanness degree FGSC (0~255) for determining the target intake door opening FTI. The final cleanness degree FGSC serves as a control input, and the target intake door opening FTI is a control output determined in dependence on the control input.

At the step S58, the control section 13 checks whether a predetermined differential time ΔA sec has elapsed.

At the step S59, the control section 13 determines a derivative value DTGS of GSC by determining a difference (OGSC−GSC) between the previous value OGSC of the relative cleanness degree and the current value GSC of the relative cleanness degree. The derivative GSC value DTGS is the amount of a change of the cleanness degree GSC during the differential time ΔA sec. (The step S59 corresponds to differentiating means.) In this example, DTGS represents a time rate of change of the degree of uncleanness of the outside air.

At the step S60, the control section 13 checks whether the derivative GSC value DTGS is greater than zero (DTGS>0).

When the derivative GSC value DTGS is equal to or smaller than zero, that is, when the outside exhaust gas condition is stable or changing in a clean direction toward a higher degree of cleanness or a cleaner state, then the derivative GSC value DTGS is set equal to zero (DTGS=0) at the step S61.

When the outside exhaust gas condition change is in an unclean direction toward a higher degree of uncleanness or pollutedness or to a less clean state, and hence the derivative GSC value DTGS is greater than zero (DTGS>0), then the control section 13 proceeds from the step S60 to the step S62, and checks, at the step S62, whether a previous derivative GSC value ODTGS is equal to zero (ODTGS=0) or not to determine whether the previous outside air condition change is stable or in the cleaning direction. (The step S62 corresponds to first checking means for checking the previous outside air condition change.)

At the step S63, the control section 13 checks whether the current derivative GSC value DTGS representing the current outside air condition change is equal to or greater than a derivative threshold which, in this example, is a sum of a basic derivative threshold value DGC and a control sensitivity adjusting value DGCOST. (The step S63 corresponds to second checking means for checking the current outside air condition change.)

Figure 6:
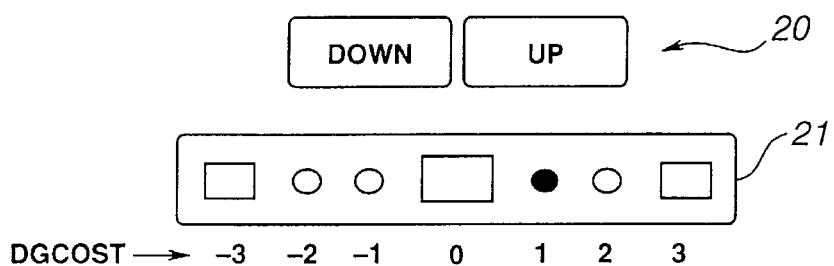
FIG. 6 is a schematic view showing a derivative threshold adjusting device which can be employed in the control system of FIG. 1.

In this example, the control sensitivity adjusting value DGCOST is an adjustable value which can be adjusted by an external adjusting operation from the outside with a derivative threshold adjusting device. As shown in FIG. 6, the derivative threshold adjusting device of this example includes a manually operable sensitivity adjusting switch 20 and an indicator 21, connected with the adjusting switch 20, for indicating the adjusted derivative threshold level. In this example, the adjusting switch 20 is installed in the instrument panel of the vehicle, and arranged to enable adjustment of the derivative threshold quantity DGCOST among 7 levels. In the state of the indicator 21 shown in FIG. 6, DGCOST is set at one (DGCOST=1).

At the step S64, the control section 13 sets the cleanness degree GSC to zero (GSC=0) to bring the intake door 1 forcibly to the fully closed state, by concluding that the outside air condition changes in the unclean direction from the first judgment of the step S62 that the previous air condition change is not in the polluting unclean direction (in the stable state or in the changing state in the clean direction, that is) and the second judgment of the step S63 that the current outside air condition change is equal to or greater than the threshold quantity (DGC+DGCOST). (The step S64 corresponds to predictive controlling means for commanding the intake door to close the outside air inlet.)

At the step S65, the current derivative GSC value DTGS is set as the previous derivative GSC value ODTGS for the next cycle.

At the step S66, the current cleanness degree GSC is set as the final control cleanness degree (or final control input variable) FGSC.

[Outside Uncleanness Predictive Control]

The intake door control responsive to the ambient exhaust gas concentration alone is not always sufficient for preventing inflow of offensive outside exhaust gases into the passenger compartment of the vehicle in particular when, for example, a shot of exhaust gases is discharged from a vehicle cutting in on the lane. Without the predictive control according to this embodiment, the intake door 1 would not be fully closed until FGSC exceeds a preset threshold level, and the exhaust gases would enter the vehicle due to a delay of the responsive door closing operation.

The check of the step S63 alone without the step S62 would make the intake door control performance unstable and troublesome with too frequent intake door closing operations specifically when combined with a system susceptible to noises and a responsive gas sensor. Moreover, this would deteriorate the ventilation for the passenger compartment by increasing the time of the full recirculation mode.

In this embodiment, by contrast, the step S64 is reached only when the requirements of the steps S62 and S63 are both met. With both the first checking of the step S62 and the second checking of the step S63, the control system can anticipate a blow of exhaust gases and close the intake door responsively.

Figure 7:
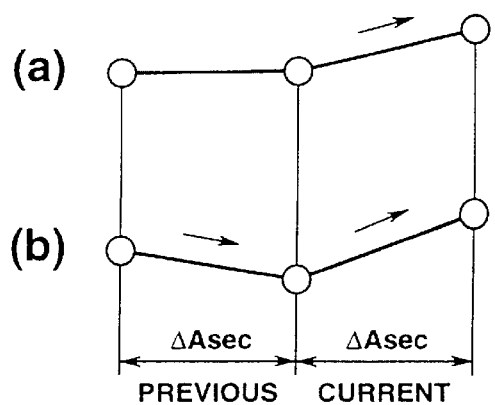
FIG. 7 is a view for illustrating patterns of exhaust gas concentration changes initiating an exhaust gas concentration predictive control shown in FIG. 4.

This control system closes the intake door 1 in dependence on the current derivative GSC value DTGS only when the previous exhaust gas condition change is in the stable state as shown in the upper half of FIG. 7, or in the changing state in the clean direction toward a cleaner condition as shown in the lower half of FIG. 7. The control system can close the intake door 1 responsively and timely when needed, while preventing unwanted frequent door control operations and ensuring good ventilation.

[Threshold Adjustment]

The derivative threshold (DGC+DGCOST) appearing in the step S63 increases the difficulty to enter the outside air uncleanness predictive control when it (DGC+DGCOST) is increased, and lowers the difficulty when decreased. Attitudes toward odors of exhaust gases differ among individuals. Some are indifferent to slight odors and undesirous of frequent actions of the uncleanness predictive control. Some others are uneasy about odors, and demand the predictive control more often.

The threshold adjusting device can meet demands differing among individuals by enabling a driver and passengers to adjust the threshold level manually. The indicator 21 displays the adjusted threshold level visually, and facilitates adjustment with the adjuster 20.

[Combination of Uncleanness Predictive Control and Uncleanness adaptive Control]

The uncleanness predictive control is effective with its high-response control performance against a sudden drift of exhaust gas. However, the predictive control is not always effective specifically to a long-continued polluted condition as in an urban area. When the outside exhaust gas concentration continues high with small changes, the intake door might be held open, and allow the exhaust gases to enter the passenger compartment.

The control system according to this embodiment can prevent this by combining the predictive control with the uncleanness adaptive control as shown in FIG. 3. In the ambient situation in which the predictive control is not evoked, the control system performs the exhaust gas concentration adaptive intake door control according to the control characteristic of FIG. 5 by using the control input FGCS determined in the step S30. In this case, therefore, the outside air inlet is put in the outside air intake mode in the clean state where the degree of uncleanness of the outside air is low, and in the inside air recirculation mode in the unclean state where the degree of uncleanness is high.

The control system according to this embodiment can achieve both shutoff of unclean air and ventilation effectively by combining the uncleanness predictive control and the uncleanness adaptive control in an advantageous manner.

[Delay Control]

Immediate closure of the intake door 1 in response to a change of the target intake door position from the fully closed position to the fully open position would cause undesired leftover of exhaust gas odors in the passenger compartment due to a lag of the deodorant filter 4, and undesired frequent door operations.

In the case of door opening operation from REC to FRE, therefore, control is transferred from the step S36 to the step S39 in the flowchart of FIG. 2, and the actual opening operation of the intake door 1 is delayed intentionally by the amount of time specified by R with respect to generation of the command to fully open the intake door 1.

This delay control ensures a time for removing residual odors, and prevents unwanted frequent door operations.

[Defogger Mode Adaptive Control]

When the DEF mode is selected to dispel condensation on windows, the answer of the step S34 becomes affirmative and the steps S35~S42 are skipped to eliminate adverse influence of the exhaust gas concentration adaptive control on the performance of the defogger (or defroster).

When the (thermal) load is high as in a cool down operation in the auto air conditioning control, the step S33 causes control transfer to the control mode (normal control mode) in which priority is given to the auto air conditioning control even if the air is clean.

[Variations and Modifications]

In the example of FIGS. 3 and 4, the control input GSC is calculated by using the clean degree GSMX as a reference. However, it is optional to employ, as the control input representative of the degree of uncleanness, the digital signal obtained by the A/D conversion from the exhaust gas sensor output signal, instead of using GSMX.

The derivative threshold used in the step S63 may be adjustable as in the example of FIG. 4, or may be fixed without the need for the adjusting device.

As the adjusting device, it is possible to employ various switches and selectors. Some examples are; dial selectors or a device having a bottom switch for each level of the threshold.

It is possible to employ the uncleanness predictive control alone without the uncleanness adaptive control. In this case, the control system may be so arranged that, when the derivative requirements of the steps S62 and S63 are satisfied and the intake door is fully closed, the intake door is held fully closed for a time interval preset by an interval timer, and the intake door is opened at the end of the preset time interval. Alternatively, the control system may be arranged to monitor behavior of the ambient exhaust gas concentration after the closure of the intake door, and to open the intake door in response to detection of a change in the clean direction or detection of a predetermined clean level.

In the example shown in FIG. 5 by a solid line, the intake door is controlled between the fully open position and the fully closed position in a manner of on-off control in dependence on the result of comparison of the control input FGSC indicative of the exhaust gas concentration with a predetermined threshold level. However, it is optional to multi-step control or continuous control instead. For example, the opening degree of the intake door may be varied gradually as shown by a broken line in FIG. 5. By designing a control characteristic based on correlation of the strength of odor with the intake door opening, it is possible to achieves two different goals simultaneously, prevention of increase of the CO2 percentage in the passenger compartment, and restraint of sensorily evaluated exhaust gas odors.

Figure 8:
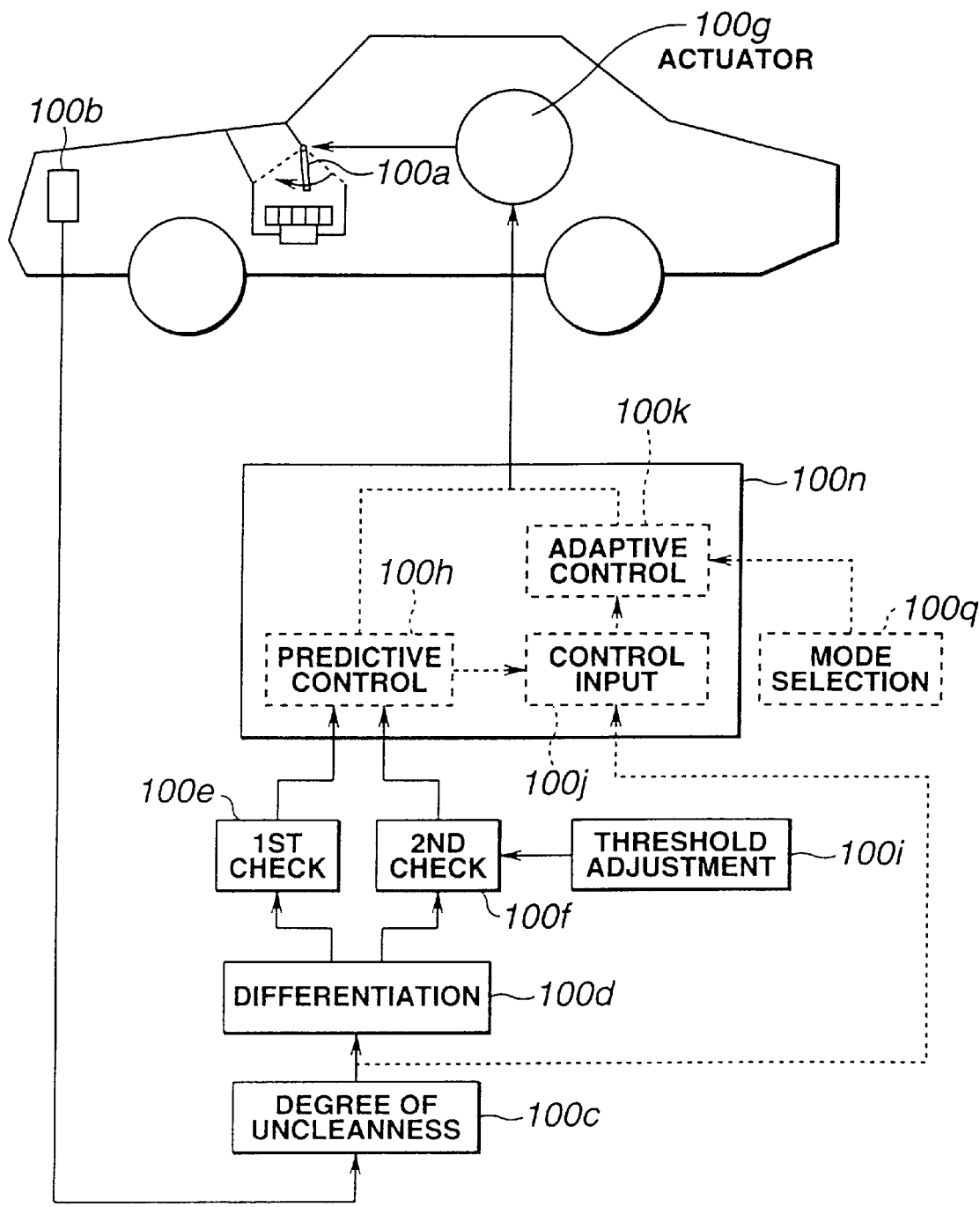
FIG. 8 is a schematic view showing as an example an arrangement of elements which can be employed in the present invention.

FIG. 8 shows various elements which can be employed in the present invention. An element 100a is a device, such as the intake door 1, for varying the outside air inlet opening. An element 100g is an actuator for controlling the element 100a. An element 100b is a sensor, such as the exhaust gas sensor 8, for sensing an outside air condition to sense the degree of uncleanness. An element 100c serves as exhaust gas concentration calculating means for calculating an ambient exhaust gas concentration from a sensor output signal of the element 100b. An element 100d serve as differentiating means for calculating a time rate of change of the exhaust gas concentration. Elements 100e and 100f serve, respectively, as first and second checking means for checking previous and current values of the time rate to determine whether first and second requirements are satisfied. An element 100n serves as controlling means for closing the outside air inlet when the first and second requirements are met. An element 100i is for adjustment of a threshold (such as DGC+DGCOST). An element 100q is a selector for selecting an air conditioner operating mode. The controlling element 100n may include a predictive control subelement 100h corresponding to the step S64, a control input determining subelement 100j corresponding to the step S66, and an adaptive control subelement 100k corresponding to the steps S31~S41. The element 100h may be connected with the element 100j, and arranged to force the control input such as GSC to a value to fully close the outside air inlet when the first and second requirements are met. A control apparatus according to the present invention may be in the form of a control module including at least one central processing unit, or may further include one or more external elements such as a sensor or an actuator.

This application is based on a prior Japanese application No. 10(1998)-191842. The entire contents of the Japanese Patent Application No. 10(1998)-191842 with a filing date of Jul. 7, 1998 are hereby incorporated by reference.

The invention is not limited to the embodiments described above. Modifications and variations of the embodiments described above will occur to those skilled in the art in light of the above teachings.

What is claimed is:

1. An outside air intake quantity control apparatus for controlling an outside air intake quantity of outside air introduced into a compartment of a vehicle, the outside air intake quantity control apparatus comprising:

exhaust gas concentration calculating means for calculating an ambient exhaust gas concentration from a sensor output signal from an ambient exhaust gas sensor;

differentiating means for calculating a derivative of the exhaust gas concentration representing a time rate of change of the exhaust gas concentration;

first checking means for checking a previous value of the derivative calculated at a previous time, to determine whether a previous exhaust gas concentration change is in one of a stable state and a changing state in a clean direction toward a cleaner state;

second checking means for checking whether a current value of the derivative calculated at a current time is equal to or greater than a predetermine derivative threshold; and controlling means for controlling an outside air inlet opening to reduce the outside air intake quantity to a minimum value when the previous exhaust gas concentration change is in one of the stable state and the changing state in the clean direction and the current value of the derivative is equal to or greater than the predetermine derivative threshold.

2. The outside air intake quantity control apparatus as recited in claim 1 further comprising an intake door for varying the outside air inlet opening to vary the outside air intake quantity in response to a control signal produced by the controlling means, the ambient exhaust gas sensor for sensing the ambient exhaust gas concentration, and threshold adjusting means for adjusting the derivative threshold in response to an external operation.

3. The intake door control apparatus as recited in claim 2 wherein the threshold adjusting means comprises a manual sensitivity adjusting switch for adjusting the derivative threshold, and an indicator for indicating a level of the derivative threshold adjusted by the adjusting switch.

4. The intake door control apparatus as recited in claim 1 wherein the controlling means comprises predictive control means for controlling the outside air inlet opening to reduce the outside air intake quantity forcibly to the minimum value when the previous exhaust gas concentration change is in one of the stable state and the changing state in the clean direction and the current value of the derivative is equal to or greater than the predetermine derivative threshold, and adaptive control means for controlling the outside air inlet opening in accordance with a degree of uncleanness determined from the exhaust gas concentration so as to decrease the outside air inlet opening with increase of the degree of uncleanness when the previous exhaust gas concentration change is in a changing state in an unclean direction toward a less clean state or the current value of the derivative is smaller than the derivative threshold.

5. The intake door control apparatus as recited in claim 1 wherein the control apparatus further comprises a passenger sensor for sensing the number of passengers in the vehicle, and said controlling means includes means for limiting a duration during which a full recirculation mode for preventing the introduction of the outside air continues, to a maximum time length, and for decreasing the maximum time length with increase in the number of passengers sensed by the passenger sensor.

6. The intake door control apparatus as recited in claim 1 wherein said controlling means comprises adaptive controlling means for performing an adaptive intake door position control for controlling the outside air intake quantity in accordance with the exhaust gas sensor output signal, and canceling the adaptive intake door position control responsive to the exhaust gas sensor output signal when a defogger mode is selected.

7. A vehicle air conditioning system comprising:

an output section comprising an actuator for varying an outside air inlet opening degree to vary an amount of an outside air introduced into a compartment of a vehicle in response to a control signal;

an input section comprising an outside air condition sensor for sensing an unclean condition of the outside air; and a control section comprising a controller for controlling the outside air inlet opening degree to control the amount of the outside air introduced into the compartment of the vehicle by producing the control signal in accordance with an output signal of the outside air condition sensor, for determining an outside air condition quantity indicative of a degree of uncleanness of the outside air from the output signal of the outside air condition sensor, for monitoring changes of the outside air condition quantity successively, and for reducing the outside air inlet opening degree to a minimum setting when a previous change of the outside air condition quantity is not in an unclean direction toward a less clean state, and at the same time a current change of the outside air condition quantity has a direction in the unclean direction and a magnitude greater than or equal to a predetermined threshold.

8. The vehicle air conditioning system as recited in claim 7 wherein the controller is configured to produce a first condition signal when the previous change of the outside air condition quantity is not in the unclean direction, to produce a second condition signal when the current change of the outside air condition quantity is in the unclean direction and at the same time the magnitude of the current change is greater than or equal to a predetermined threshold, and to reduce the outside air inlet opening degree to the minimum setting when the first and second conditions signals are both present.

9. The vehicle air conditioning system as recited in claim 8 wherein the controller is configured to determine a series of values of a time rate of change of the degree of uncleanness of the outside air successively in accordance with changes in the outside air condition quantity, to produce the first condition signal when a first value of the time rate of change of the degree of uncleanness is equal to or smaller than zero, and to produce the second condition signal when a second value of the time rate of change of the degree of uncleanness subsequent to the first value is equal to or greater than the threshold.

10. The vehicle air conditioning system as recited in claim 9 wherein the controller is configured to control the outside air inlet opening degree in accordance with the outside air condition quantity so that the outside air inlet opening degree is reduced to the minimum setting when the outside air condition quantity is in a predetermined uncleanness range, and to force the outside air condition quantity into the uncleanness range to force the outside air inlet opening degree to the minimum setting when the first and second condition signals are both present.

11. The vehicle air conditioning system as recited in claim 10 wherein the controller is configured to control the outside air inlet opening degree in accordance with the outside air condition quantity when at least one of the first and second condition signals is absent.

12. An air intake door control process for a vehicle air conditioning system comprising an intake door for opening and closing an outside air inlet, the air intake door control process comprising the steps of;

ascertaining a sensed ambient exhaust gas concentration of an outside air;

calculating an outside air condition quantity representing an outside exhaust gas concentration from the sensed ambient exhaust gas concentration;

determining a time series of values of a time rate of change of a degree of uncleanness of the outside air by monitoring variation in the outside air condition quantity;

checking a previous value of the time rate calculated at a previous time, to determine whether a previous exhaust gas concentration change is in one of a stable state and a changing state in a clean direction toward a cleaner state;

checking a current value of the time rate calculated at a current time, to determine whether the current value of the time rate is equal to or greater than a predetermine rate threshold; and commanding the intake door to close the outside air inlet when the previous exhaust gas concentration change is in one of the stable state and the changing state in the clean direction and the current value of the time rate is equal to or greater than the predetermine rate threshold.

* * * * *